United States Patent
Gennetten et al.

(10) Patent No.: US 7,639,897 B2
(45) Date of Patent: Dec. 29, 2009

(54) METHOD AND APPARATUS FOR COMPOSING A PANORAMIC PHOTOGRAPH

(75) Inventors: K. Douglas Gennetten, Fort Collins, CO (US); David W. Boyd, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 835 days.

(21) Appl. No.: 11/339,268

(22) Filed: Jan. 24, 2006

(65) Prior Publication Data

US 2007/0172151 A1 Jul. 26, 2007

(51) Int. Cl.
G06K 9/32 (2006.01)
(52) U.S. Cl. .................. 382/299; 382/282; 382/284; 348/36
(58) Field of Classification Search .............. 382/282, 382/284, 299; 348/36, 50
See application file for complete search history.

(56) References Cited

U.S. PATENT DOCUMENTS

| | | | |
|---|---|---|---|
| 5,940,121 A * | 8/1999 | Mcintyre et al. ............. 348/64 |
| 6,075,905 A | 6/2000 | Herman et al. |
| 6,304,682 B1 | 10/2001 | Patti |
| 6,307,550 B1 * | 10/2001 | Chen et al. ................. 345/418 |
| 6,549,215 B2 * | 4/2003 | Jouppi ........................ 345/660 |
| 6,834,128 B1 | 12/2004 | Altunbasak et al. |
| 7,130,490 B2 * | 10/2006 | Elder et al. .................. 382/294 |
| 2002/0135672 A1 | 9/2002 | Sezan et al. |

OTHER PUBLICATIONS

Altunbasak,et.al, "A Fast Method of Reconstructing High-Resolution Panoramic Stills From MPEG-Compressed Video", Multimedia Signal Processing,1998 IEEE 2nd Workshops,p. 99-104.
Deng,et.al, "Generating Panorama Photos", Proc. of SPIE Internet Multimedia Manangment Systems IV, vol. 5242, ITCOM, Orlando, Sep. 2003, pp. 10.
Mann,et.al, "Painting With Looks: Photographic Images from Video Using Quantimetric Processing", Multimedia '02, Dec. 1-6, 2002, France, copyright 2002, pp. 117-126.
Patti,et.al, "Superresolutin Video Reconstruction With Arbitrary Sampling Lattices and Nonzero Aperture Time",IEEE Transactions on Image Processing, vol. 6,No. 8,Aug. 1997,pp. 13.

* cited by examiner

*Primary Examiner*—Yosef Kassa

(57) ABSTRACT

Methods and apparatus are disclosed for guiding a camera user to take an appropriate set of component photographs to be stitched into a stitched panoramic photograph of a scene. In one example embodiment, the camera constructs and displays a video mosaic while the user sweeps the field of view of the camera over the scene. The camera computes the number and locations of a set of component photographs that will tile the scene, and then guides the user to sweep field of view of the camera over the scene a second time, visiting each component photograph location. A high-resolution component photograph may be taken at each location. Optionally, the camera gathers information from frames used to construct the video mosaic and uses the information to select settings for focus, exposure, or both to be used during the taking of the component photographs.

20 Claims, 9 Drawing Sheets

METHOD AND APPARATUS FOR COMPOSING A PANORAMIC PHOTOGRAPH

FIELD OF THE INVENTION

The present invention relates to panoramic photography, and more specifically to the composition of a panoramic photograph.

BACKGROUND OF THE INVENTION

A panoramic photograph is a photograph with an unusually large field of view, an exaggerated aspect ratio, or both. High resolution panoramic photographs can be striking, especially when printed or displayed in a large size Historically, panoramic photographs have been taken using specially-made cameras that produced negatives or transparencies of unusual sizes. Accordingly, panoramic photography was often practiced by professional photographers with specialized equipment for handling these unusual film sizes.

Another method of making a panoramic photograph is to take several overlapping conventional photographs, each typically having an aspect ratio of about 3:2, and then join them together into a single larger photograph. The joining is typically done using a computer operating on digital representations of the component photographs. Often, the digital representations are obtained directly using a digital camera to photograph the subject. This process of combining digital images into a larger photograph is often called stitching. Recent advances in computer hardware and software have enabled even amateur and casual photographers to create panoramic photographs by this method. Some digital cameras can perform stitching using an internal processor, without the need for a separate computer.

FIGS. 1A-1D illustrate the process of creating a panoramic photograph from component photographs. FIG. 1A shows a landscape scene 100 with a large field of view. FIG. 1B shows six overlapping component photographs 101, 102, 103, 104, 105, 106 of a conventional aspect ratio, taken so that each portion of scene 100 that is to be included in the resulting panoramic photograph is represented in at least one of the component photographs 101-106. FIG. 1C shows component photographs 101-106 in isolation. Certain features such as tree 107 and fence corner 108 appear in more than one of the component photographs, and may be used by the stitching process to align component photographs 101-106 with each other. FIG. 1D shows a stitched panoramic photograph 109 constructed by stitching component photographs 101-106 together. Stitched panoramic photograph 109 has a larger field of than any of component photographs 101-106. It might be possible to photograph the entire field of view of photograph 109 with a single exposure if a wide-angle lens were put on the camera, but that single wide-angle photograph would have less detail than stitched panoramic photograph 109.

A stitched panoramic photograph such as photograph 109 is sometimes called a "mosaic". That term is sometimes used to describe a panoramic photograph stitched from a two-dimensional array of component photographs (such as example photograph 109), but for the purposes of this disclosure, the terms "stitched panoramic photograph" and "mosaic" will be used interchangeably to refer to a photograph stitched from an array of component photographs, whether the array consists of a single row or column, or comprises more than one row or column.

The component photographs used to create a mosaic may be individual still photographs, or may be frames of digital video. Often, when video frames are used, the interval between successive frames is short in relation to the speed of camera motion so that the fields of view of successive frames overlap considerably. Mathematical comparison of successive frames, for example using correlation techniques, can reveal information about the path of the camera motion. With sufficient processing capability, video stitching and motion tracking can be performed in real time.

Methods are well-known for stitching a mosaic from a suitable set of component photographs, and commercial software is available for performing this task. But camera users may struggle to take a suitable set of component photographs. In the absence of any guidance from the camera, the user must mentally keep track of how much of a scene is encompassed by a particular component photograph, and then properly position the camera for each succeeding component photograph so that the component photographs overlap, while avoiding excessive overlap. If an error is made and a portion of the scene is missed by all of the component photographs, the mosaic is ruined.

Some cameras provide a panoramic mode that assists the photographer in composing the component photographs, for example by indicating how much overlap exists between two consecutive photographs. However, these cameras typically do not provide assistance for composing two-dimensional mosaics, and typically require that the photographer take the leftmost component photograph of a stitched panorama first. This makes it difficult to estimate the correct position of the starting component photograph so that the ends of the stitched panorama are centered over the desired view. Furthermore, the camera may not provide a method of choosing exposure settings appropriate for the entire scene.

DETAILED DESCRIPTION

Figure 1A:
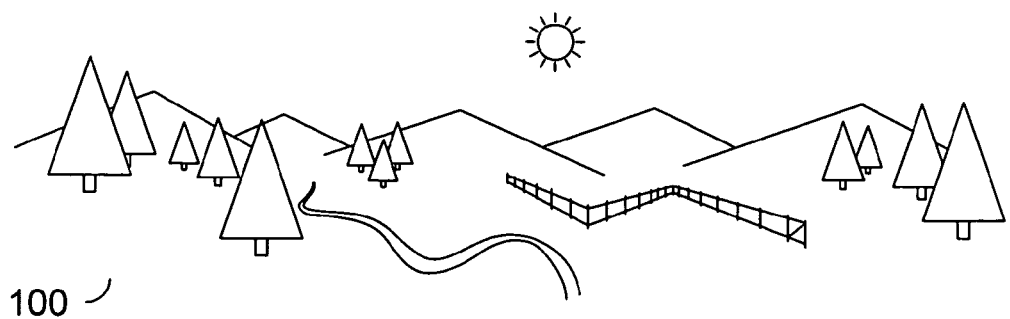
FIG. 1A shows a landscape scene with a large field of view.
Figure 1B:
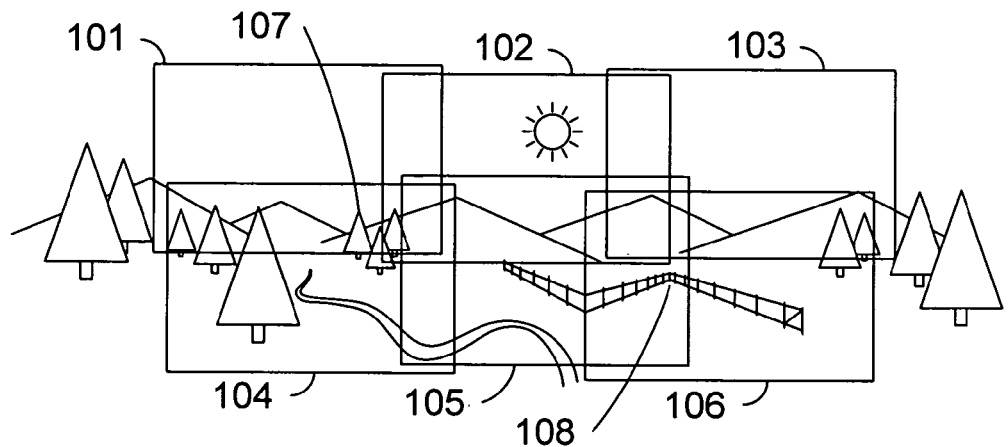
FIG. 1B shows six overlapping component photographs of a conventional aspect ratio, taken of the scene of FIG. 1A.
Figure 1C:
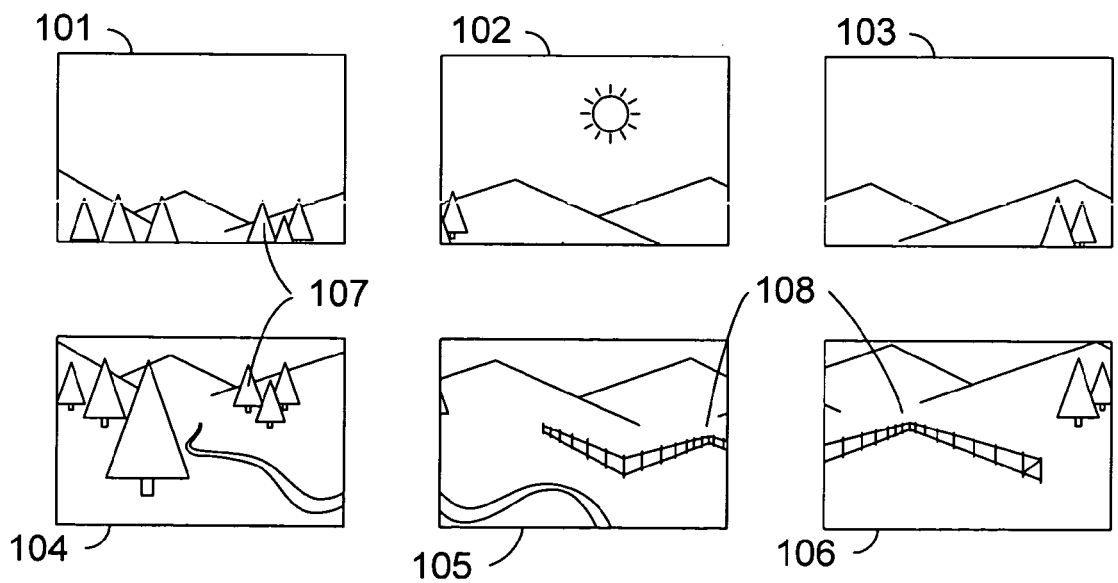
FIG. 1C shows the component photographs of FIG. 1B in isolation.
Figure 1D:
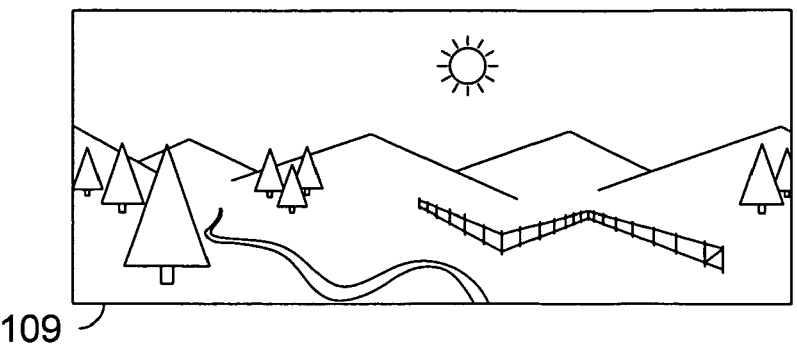
FIG. 1D shows a panoramic photograph constructed by stitching together the component photographs of FIG. 1B.
Figure 2:
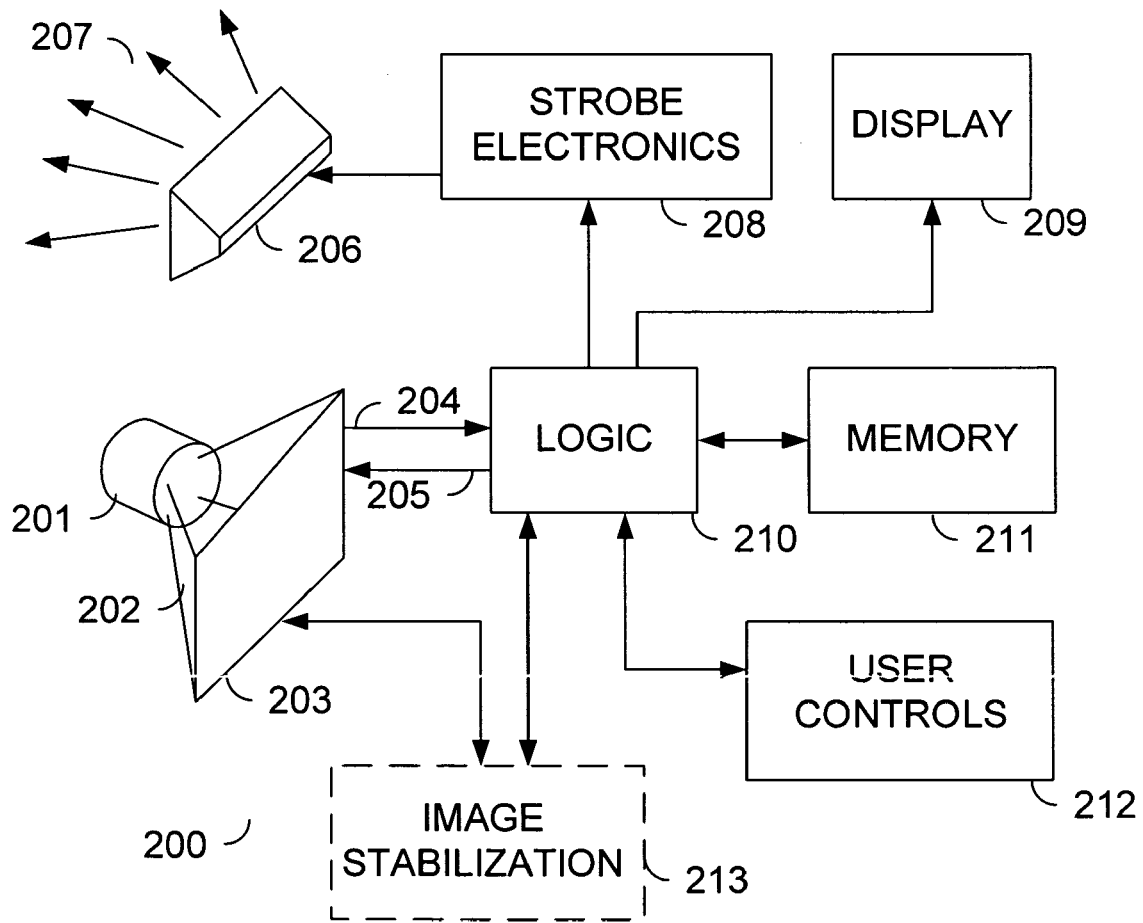
FIG. 2 shows a simplified block diagram of a digital camera in accordance with an example embodiment of the invention.

FIG. 2 shows a simplified block diagram of a digital camera 200. Lens 201 gathers light emanating from a scene, and redirects the light 202 to an electronic array light sensor 203. Sensor 203 comprises an array of light-sensitive elements, often called pixels. Each pixel on array 203 corresponds to a particular scene location by virtue of the operation of lens 201. A common type of electronic array light sensor generates, at each pixel, electric charge at a rate proportional to the intensity of light falling on the pixel, and stores these charges in charge coupled devices. Such a sensor is often called a "CCD sensor", or simply a "CCD". Other kinds of sensors may be used as well. In many cameras, each sensor pixel also comprises a color filter so that color information about the scene is obtained. One of skill in the art will recognize that the invention may be embodied in a camera with color capability or one without. Sensor 203 communicates image data signals 204 to logic 210. Logic 210 may comprise an analog to digital converter, a microprocessor or digital signal processor, or other kinds of circuitry.

Logic 210 converts image data signals 204 to digital values representing the light intensities measured at the sensor pixel sites. An ordered array of these digital values, each representing the brightness, color, or both of a particular scene location, may be called a digital image, a digital photograph, or simply an image or a photograph. The digital values corresponding to pixel locations on sensor 203 may be called "pixel values", or "pixels. When a digital image is properly interpreted and displayed, a representation of the original scene can be reproduced from the digital image. For the purposes of this disclosure, the term "photograph" means any recorded representation of a scene, and encompasses images recorded on photographic film, images printed on paper or other stock, and digital scene representations.

Logic 210 may also perform other functions, such as generally controlling the operation of camera 200, controlling sensor 203 through control signals 205, interacting with a user of the camera through display 209 and user controls 212, processing digital images, and transmitting digital images to other equipment for processing, display, or printing.

A flash or strobe unit 206 may provide supplemental light 207 to the scene under the control of strobe electronics 208, which are in turn controlled by logic 210. Memory 211 provides storage for digital images captured by the camera, as well as for camera configuration information, for program instructions for logic 210, and for other items. User controls 212 may comprise buttons, dials, switches, or other devices by which a user controls operation of camera 200. Optionally, camera 200 may comprise an image stabilization unit 213 capable of characterizing camera motion.

Figure 3A:
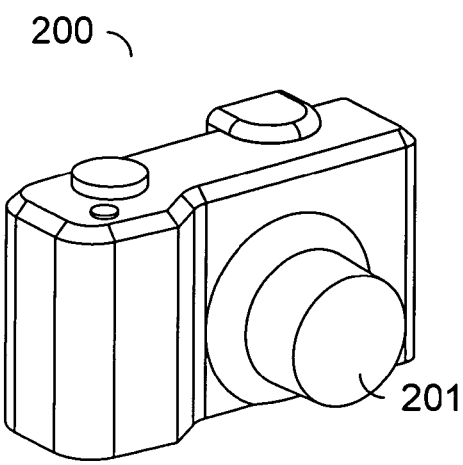
FIGS. 3A and 3B show front and rear perspective views respectively of a camera in accordance with an example embodiment of the invention.
Figure 3B:
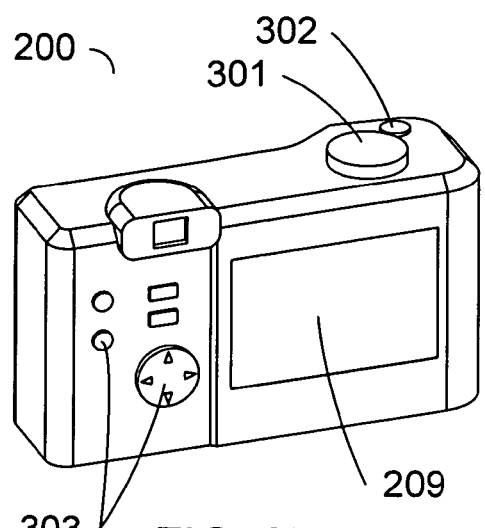

FIGS. 3A and 3B show front and rear perspective views respectively of camera 200 in accordance with an example embodiment of the invention. Lens 201 is visible in FIG. 3A. Display 209 and some example user controls 303 (part of user controls 212) are visible in FIG. 3B. Also visible are two user controls of particular interest. Shutter release 301 is the control the user depresses in order to cause a photograph to be taken. This control is called a "shutter release" for historical reasons, even if camera 200 does not comprise an actual mechanical shutter. Shutter release 301 may cause camera 200 to enter two successive states, called S1 and S2. At S1, the camera may perform automatic focusing and exposure determination. At S2, a "final" photograph is actually taken and stored in memory 211.

Control 302 is a video trigger. The user depresses and holds video trigger 302 to take video sequences. In example camera 200, video is taken for as long as video trigger 302 is held down. Video sequences are normally stored in memory 211. A frame of digital video typically contains fewer pixels than does a full-resolution still photograph taken by camera 200.

Figure 4:
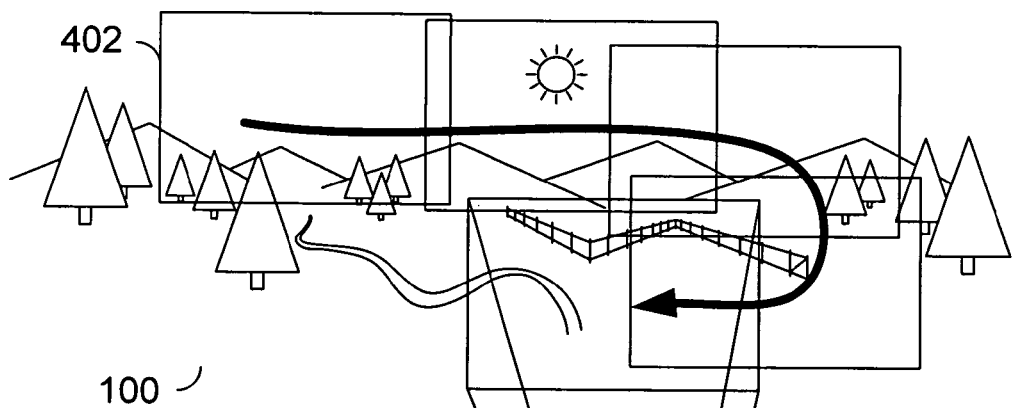
FIG. 4 illustrates a first phase in a composing a stitched panoramic photograph, in accordance with an example embodiment of the invention.
Figure 4:
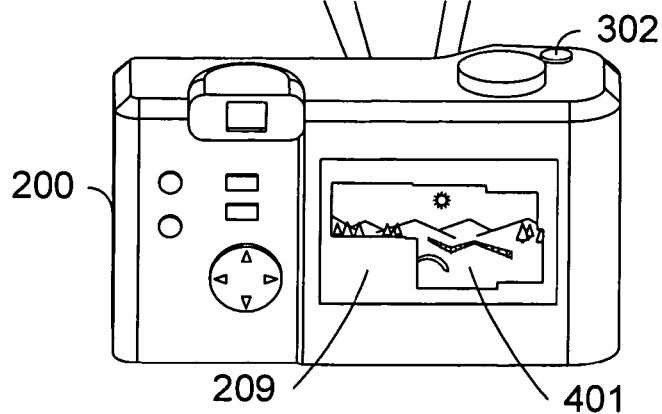

FIG. 4 illustrates a first phase in a composing a stitched panoramic photograph in accordance with an example embodiment of the invention. Camera 200 has been placed in a panoramic mode, which causes some controls to have different effects than when the camera is in its normal mode for taking still photographs. For example, video trigger 302 is now used to gather scene information rather than to take and store a video sequence. In this first step, the user holds video trigger 302 down while sweeping the field of view of camera 200 over scene 100. Camera 200 takes video frames, exemplified by area 402, during the sweep and constructs a low-resolution video mosaic 401 of the covered portion of the scene. For the purposes of this disclosure, a "video mosaic" is a still picture stitched together from overlapping video frames. For clarity of explanation, only a few video frames are illustrated in FIG. 4. Preferably, the video frames taken during the sweep overlap substantially, for example by 50 to 95 percent of the area of each frame. Mosaic 401 is constructed using well-known methods. Preferably, low-resolution video mosaic 401 is displayed on display 209 so that the user has feedback about the portion of scene 100 that has been covered. The user may choose any motion path. Preferably, all of the portion of interest of scene 100 is covered by at least one video frame so that there are no "holes" in low-resolution video mosaic 401, but this is not absolutely necessary. (The sweep and mosaic 401 in FIG. 4 are shown in progress and therefore incomplete.) Preferably, low-resolution video mosaic 401 is dynamically scaled to fit display 209. That is, preferably the scaling is adjusted as mosaic 401 grows when the user sweeps over parts of scene 100 not previously covered.

Other methods of controlling camera 200 to construct mosaic 401 are possible as well. For example, instead of using video trigger 302 to take video frames to be stitched into mosaic 401, the user may hold shutter release 301 at the S1 position during the sweep, and then depress shutter release 301 to its S2 position to indicate that the sweep is complete. Many other control methods are possible within the scope of the appended claims.

Preferably, during the sweep camera 200 gathers information from the digital video frames and uses the information to determine settings for focus, exposure, or both to be used in capturing the component photographs that will be stitched into a high-resolution mosaic. By computing settings based on information gathered from substantially the entire scene, settings can be selected that are appropriate for the entire scene. This avoids, for example, using exposure settings based on only a small portion of the scene, which can cause some component photographs to be dramatically underexposed or overexposed. Techniques for determining focus and exposure settings from a set of preliminary photographs such as the video frames of the present example are described in copending U.S. patent application Ser. No. 11/123,558, which has a common assignee with the present application. The entire disclosure of that application is hereby incorporated by reference. The video frames of the present example method can serve as the preliminary images described in application Ser. No. 11/123,558. The exposure determination may be made on a time-weighted basis, or on a position-weighted basis, or by some other method.

Figure 5:
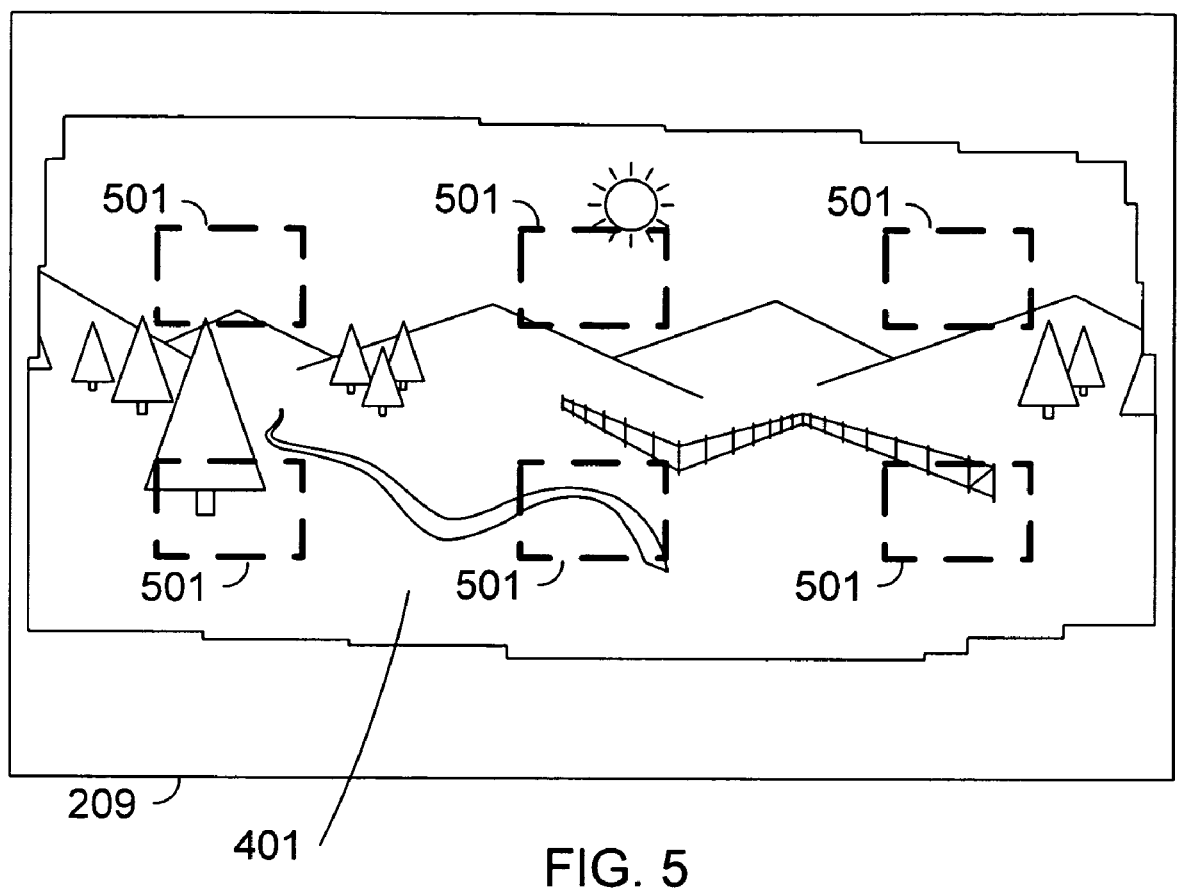
FIG. 5 shows the display of the example camera of FIGS. 3A and 3B during a second phase of composing a stitched panoramic photograph, in accordance with an example embodiment of the invention.

Once the sweep of the scene is complete, another phase of the composition is entered. For example, the user may release video trigger 302 to signal that the sweep is complete, or may provide some other signal or control indication. FIG. 5 shows display 209 of example camera 200 in this phase in accordance with an example embodiment of the invention. The rest of camera 200 has been removed from FIG. 5 for clarity. In this phase, camera 200 displays the low-resolution video mosaic 401 (now complete) on display 209.

Because camera 200 has tracked the camera motion throughout the sweep, it can easily calculate the number and positions of high-resolution component photographs needed to tile the swept scene field of view. For the purposes of this disclosure, to tile the swept scene field of view is to cover it with component photographs with appropriate overlap for later stitching. The amount of overlap between high-resolution component photographs appropriate for later stitching will depend on the particular stitching method used, but is typically about 10 to 30 percent of the area of each component photograph.

The field of view of camera 200, and therefore the number of component photographs needed to tile the swept area, is dependent on the focal length of lens 201. Camera 200 may disable changes in lens focal length during the panoramic mode if lens 201 is a zoom lens, or may account for any focal length changes in the computation. In the example case, it is assumed that the field of view of camera 200 is the same as during the sweep and assembly of the low-resolution video preview. Six component photographs are sufficient to tile the inscribed rectangle of the example swept scene field of view. Camera 200 could be configured to capture sufficient component photographs to tile a rectangle that circumscribes the swept scene field of view, in which case nine component photographs (three rows of three photographs) would be required. For simplicity of explanation, six component photographs will be used in this example. Of course, if the user sweeps more or less of scene 100 in the first phase, then more or fewer component photographs may be used. In making a mosaic of a very wide angle scene using a camera with a narrow field of view, a very large number of component photographs may be used, in a mosaic comprising many rows and many columns.

Camera 200 indicates the positions of the component photographs in display 209. In the example shown in FIG. 5, camera 200 has drawn a rectangular marquee 501 in the display for each of the six component photographs. Each example marquee 501 encompasses a smaller field of view than the component photograph it represents, in order to avoid confusion that may be introduced by overlapping marquees. Of course, other methods of indicating component photograph positions may be envisioned.

Figure 6A:
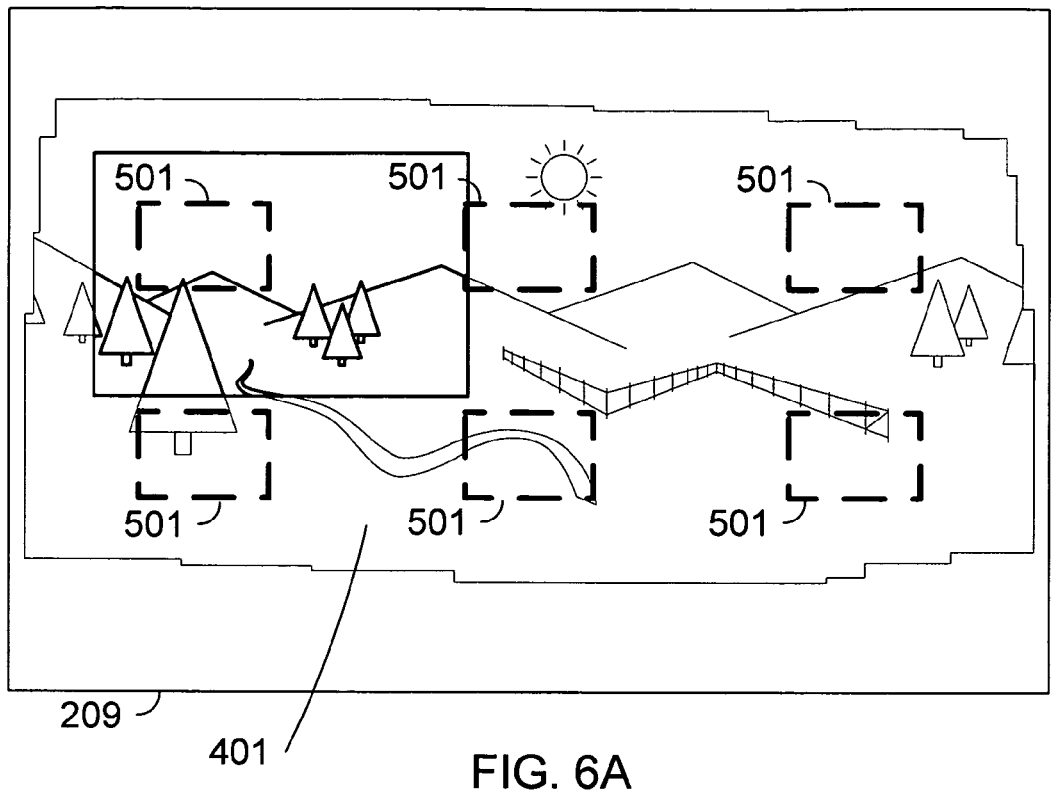
FIGS. 6A and 6B illustrate how a camera may guide the user in accordance with an example embodiment of the invention.
Figure 6B:
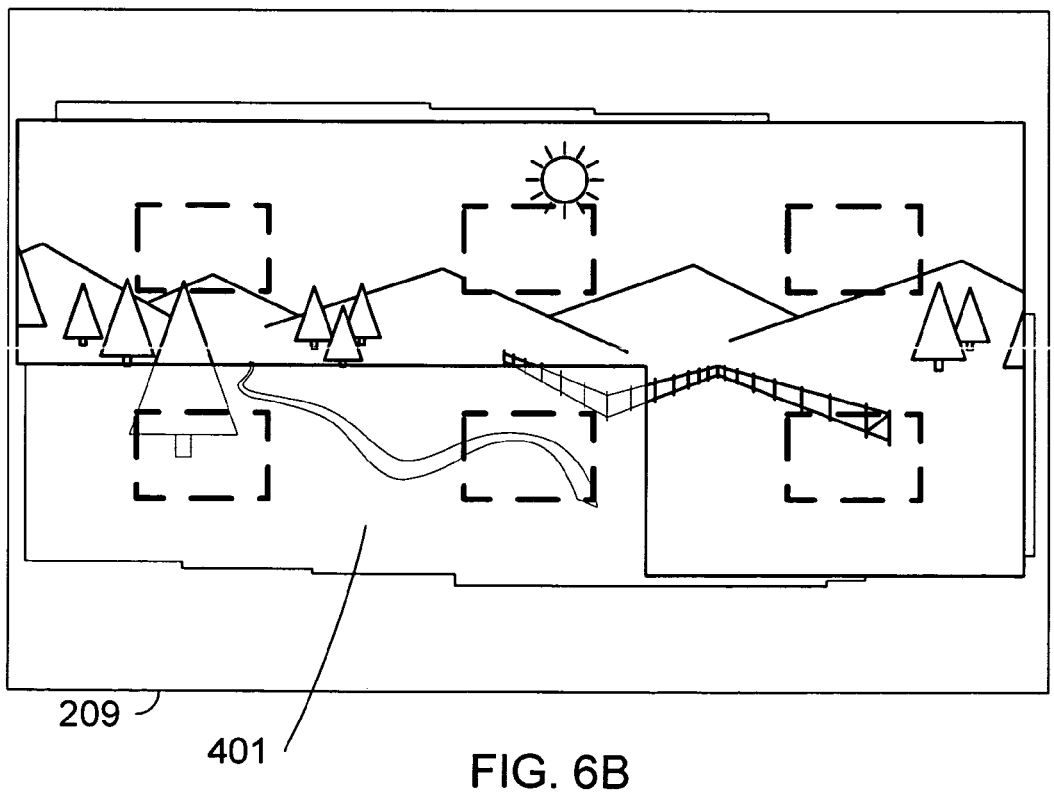

Once the component photograph positions are indicated, the user once again sweeps the camera's field of view over the scene, guided by camera 200 using display 209. FIGS. 6A and 6B illustrate how camera 200 may guide the user in accordance with an example embodiment of the invention.

In this example embodiment, camera 200 continues to track camera motion throughout the initial sweep during which low-resolution video mosaic 401 was generated, during this second guided sweep, and at any time in between the two sweeps. The camera also continues to gather repetitive digital images. These repetitive images need not be stored or become part of an eventual mosaic, but may be used for camera tracking, visual presentation, or both. The tracking may be accomplished by analysis of successively captured digital images, or by motion sensors that may be comprised in an image stabilization system. Because motion has been continually tracked, camera 200 can indicate on display 209, overlaid with low-resolution video mosaic 401, an indication of the camera's current field of view. For example, video mosaic 401 may be shown as a desaturated, pale image and the most recently captured digital image may be shown in full color. In FIG. 6A, this arrangement is indicated by showing mosaic 401 in light lines and the most recently captured image in bold lines. In FIG. 6A, the camera is aimed near, but not at, the part of the scene that will be encompassed by the upper left component photograph.

During this second sweep, the user visits each of the indicated component photograph locations at least once, and a high-resolution component photograph is taken of each of those scene portions. For the purposes of this disclosure, visiting the location of a component photograph means to aim the camera so that its field of view approximately encompasses the portion of the scene corresponding to that component photograph location in the video mosaic. In the example of FIGS. 6A and 6B, the user causes the indicated current field of view to be substantially centered over each of the six component photograph location indications 501. The component photograph locations may be visited in any order. Preferably, once a high-resolution component photograph has been taken for a particular scene portion, the corresponding portion of mosaic 401 changes character to indicate that it has been covered. For example, the covered portions could remain displayed in full color, while portions yet to be covered are desaturated.

The taking of each component photograph may be instigated manually or automatically. For example, the user may simply press shutter release button 301 once for each component photograph. Alternatively, the camera may recognize that it is aimed at a scene portion corresponding to one of the needed component photographs, and take the component photograph automatically. A method of automatically taking photographs during a pan motion for later stitching is described in U.S. Pat. No. 6,930,703, which is assigned to the assignee of the present application. The entire disclosure of that patent is hereby incorporated by reference. Briefly, as applied to the present disclosure, camera 200 compares most recent digital image with a portion of low-resolution video mosaic 401 for which a corresponding high-resolution component photograph is needed. When the comparison indicates that the camera is aimed in substantially the correct direction, the high-resolution component photograph is taken automatically.

Alternatively, camera motion may be tracked using one or more motion sensors that may be comprised in an image stabilization system. The current camera position is compared with the position required for taking a component photograph. When a close correspondence is recognized, the component photograph is taken automatically.

FIG. 6B shows an example state of display 209 after four of the six component photographs have been taken. In this example, the component photograph locations are being visited in clockwise order, having started with the upper left. Once all of the component photograph locations have been visited and a component photograph has been taken at each, this phase may end. The phase may end automatically when a component photograph has been taken at each location, or the user may indicate using one of user controls 212 that the component photograph capture is complete. The second method, in which the user indicates that component photograph is complete, has the advantage that a component photograph location may be visited more than once. For example, if a passing vehicle undesirably appears in a component photograph taken during the second sweep, the photographer may revisit that component photograph location after the vehicle is gone and take a new component photograph that replaces the ruined one.

When the component photograph capture phase is complete, the component photographs may be stitched into a high-resolution stitched panoramic photograph. The stitching may be performed by the camera, utilizing logic 210, or the component photographs may be uploaded to a computer for later stitching.

Figure 7A:
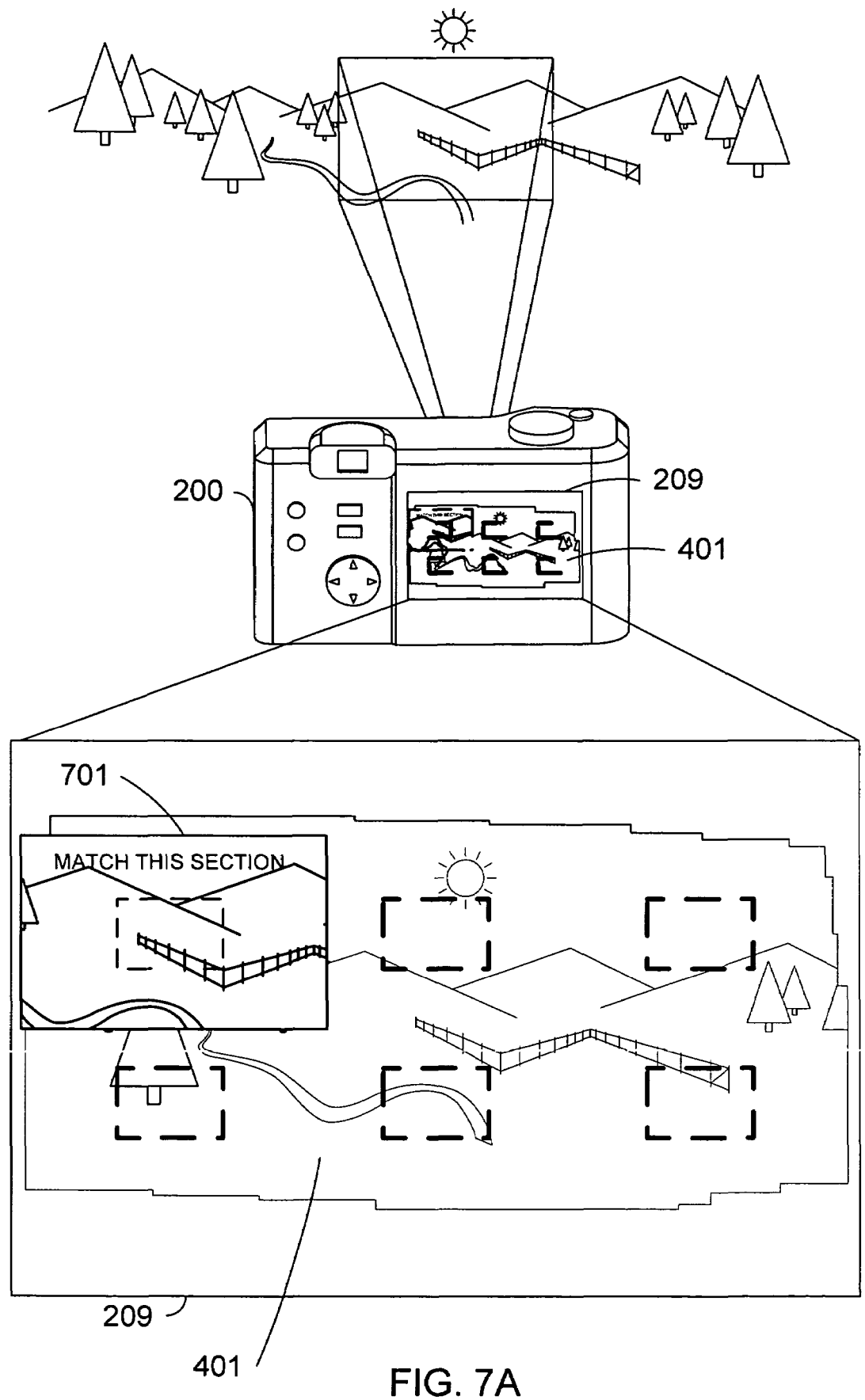
FIGS. 7A-7C illustrate guiding the user to take correct component photographs in accordance with a second example embodiment of the invention.
Figure 7B:
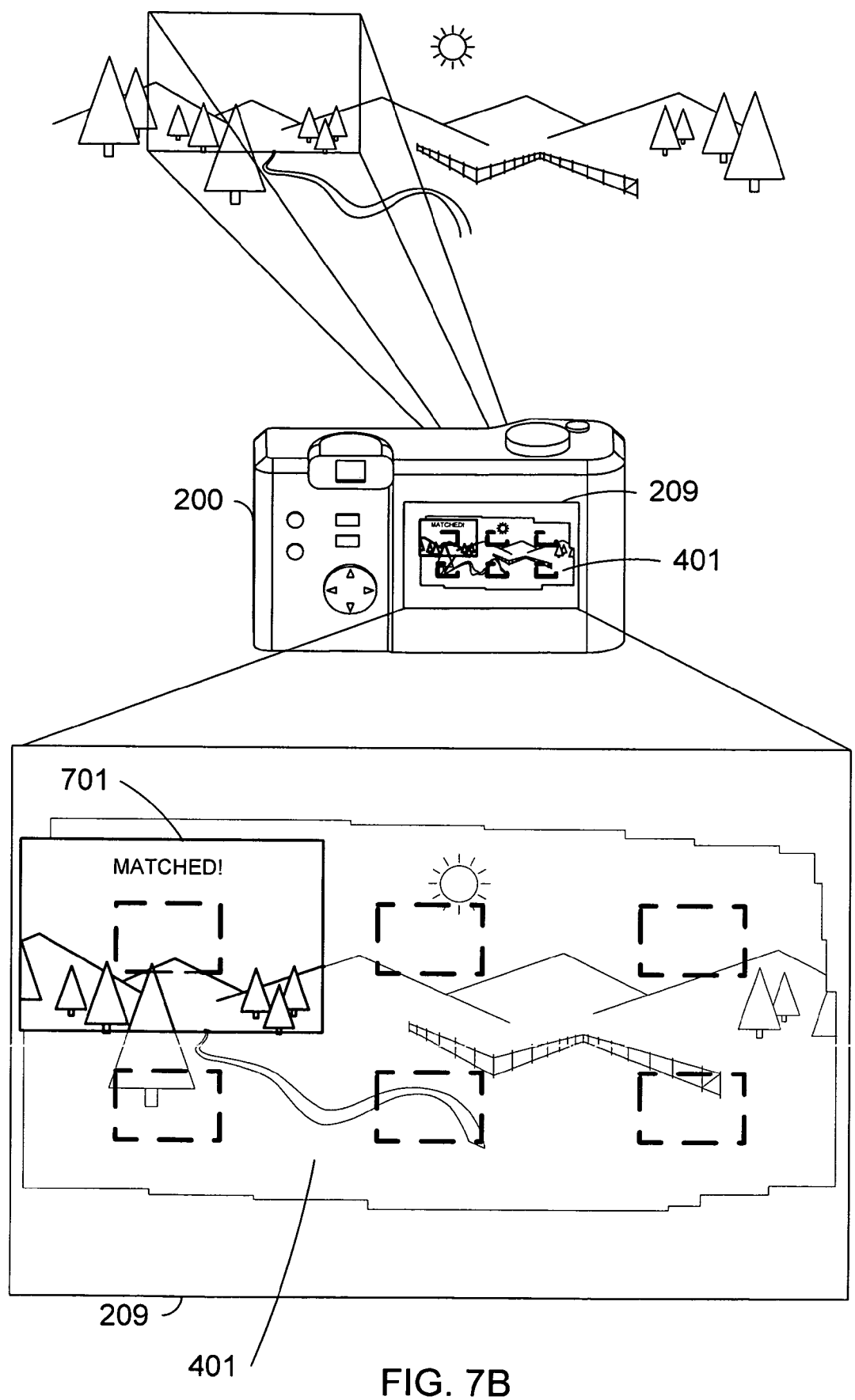
Figure 7C:
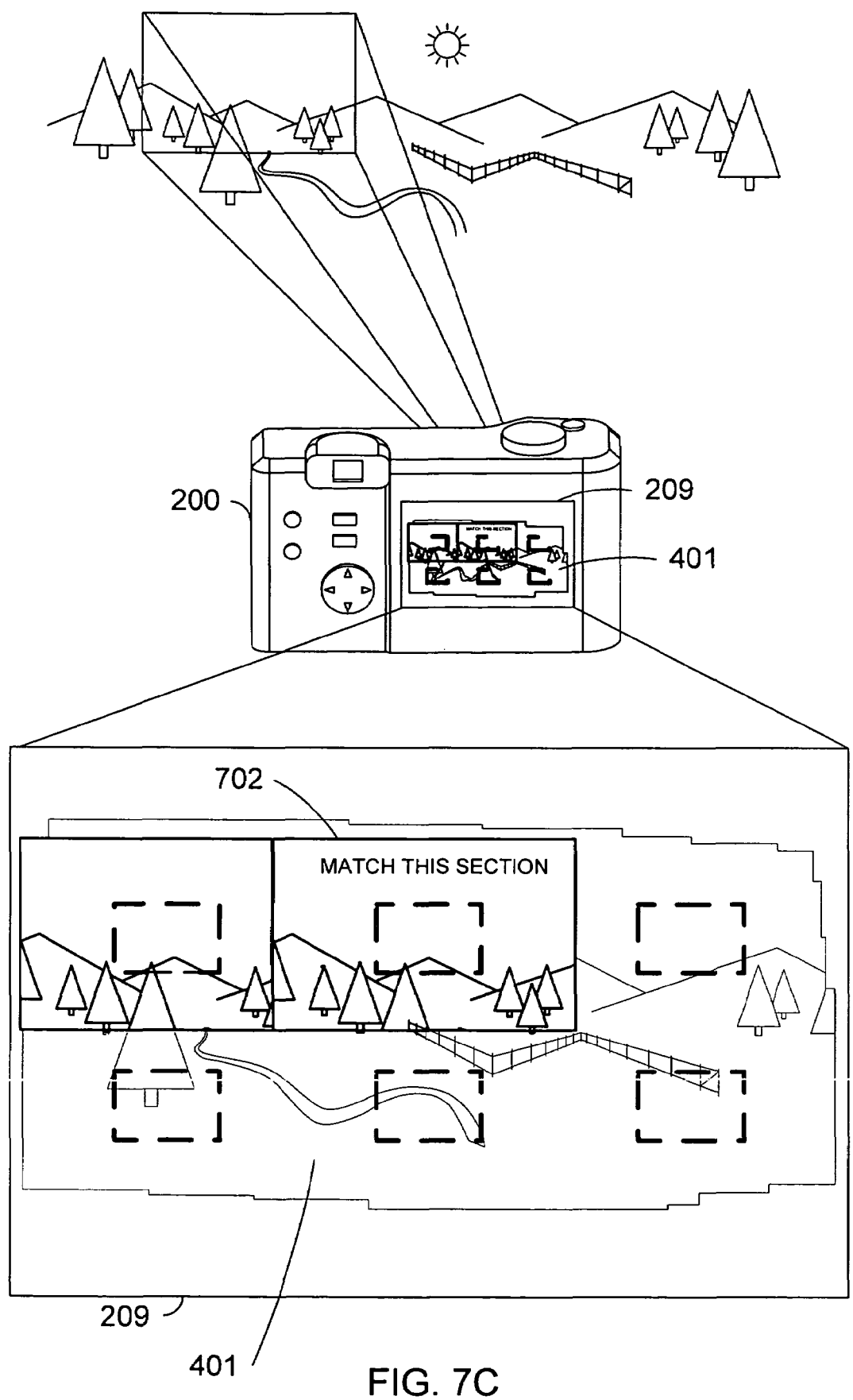

FIGS. 7A-7C illustrate guiding the user to take correct component photographs in accordance with a second example embodiment of the invention. In this example, it is assumed that the users has swept the camera's field of view over the desired scene, and that the camera has assembled and displayed low-resolution video mosaic 401 as has been previously described. The camera has also computed the number and locations of component photographs needed to tile the scene. It is during the second sweep of the scene, in which the high-resolution component photographs are taken, that his example embodiment differs from the first.

In this second embodiment, camera 200 does not continue to track camera motion after low-resolution video mosaic 401 is complete. Camera 200 does continue to take repetitive photographs, but does not use them to track camera motion. The user is guided to take the first component photograph by showing these successive photographs superimposed on low-resolution video mosaic 401 in the location where the first component photograph should be. In other words, a window 701 on display 209 corresponding to the correct location of the first component photograph will appear to show a "video" of what the camera is currently aimed at. The user is prompted to refine the aiming of camera 200 until the superimposed "video" fits in with the rest of low-resolution video mosaic 401. For example, in FIG. 7A, camera 200 is prompting the user to take the upper left component photograph, but the camera is actually aimed near the center of the scene. The camera displays the current field of view (showing a section of the center of the scene) in window 701 in the upper left location, and it is obvious that the current camera view is incorrect for that component photograph location. The camera encourages the user to "MATCH THIS SECTION" by moving the camera until the views harmonize. Because the user can see which portion of the scene the camera is currently aimed toward, the user can deduce which direction to move the camera to harmonize the contents of window 701 with the rest of mosaic 401. One of skill in the art will be able to envision many other ways to prompt the user to take a particular component photograph, including using other words and including entirely graphical methods. For example, the camera could outline window 701 with a blinking border, or may used some other graphical indicator.

FIG. 7B shows that camera 200 has now been aimed at the correct scene location for taking the first high-resolution component photograph. Camera 200 may indicate that a match has been found, based on a comparison of the corresponding portion of mosaic 401. Camera 200 may automatically take the high-resolution component photograph, or the user may simply depress shutter release 301 when the user recognizes that the contents of window 701 are harmonized with the rest of mosaic 401.

Once the first high-resolution component photograph is taken, camera 200 indicates that the second is to be taken, preferably by creating a second window 702 on display 209 and guiding the user to match that window's contents with the rest of mosaic 401. FIG. 7C illustrates guiding the user to the second component photograph location. In FIG. 7C, the camera is still pointed at the scene location of the first component photograph, and has not yet been moved to aim at the location of the second component photograph. The user proceeds as before, harmonizing the contents of window 702 with the rest of mosaic 401, at which time the second component photograph will be taken. This process repeats for each of the remaining component photographs.

Figure 8:
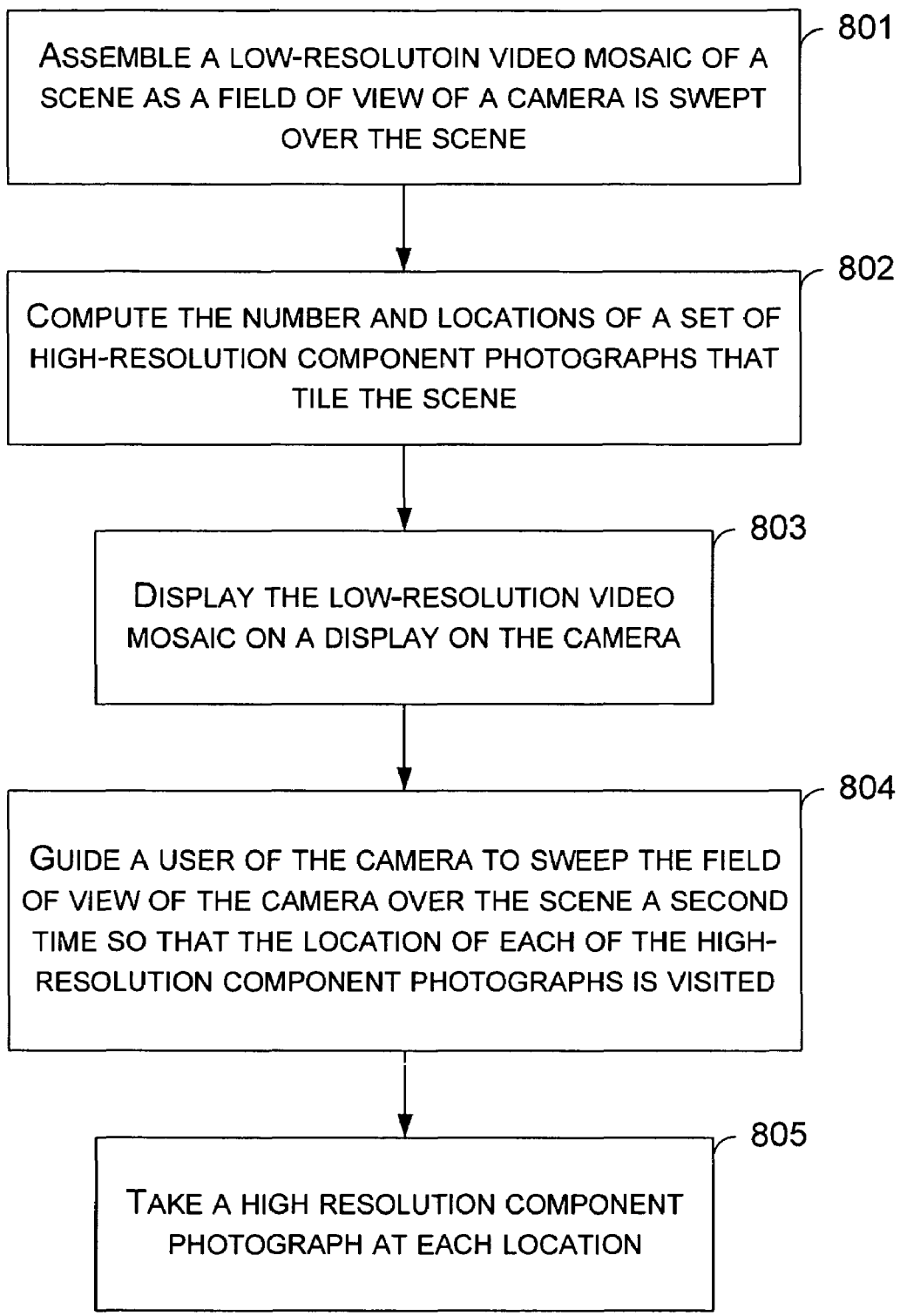
FIG. 8 shows a flowchart of a method in accordance with an example embodiment of the invention.

FIG. 8 shows a flowchart of a method 800 in accordance with an example embodiment of the invention. In step 801, a low-resolution video mosaic of a scene is constructed as a field of view of a camera is swept over a scene. In step 802, the number and locations are computed of a set of high-resolution component photographs that tile the scene. In step 803 the low-resolution video mosaic is displayed on a display on the camera. In step 804, a user of the camera is guided to sweep the field of view of the camera over the scene a second time so that the location of each of the high-resolution component photographs is visited. In step 805, a high-resolution component photograph is taken at each location.

The invention claimed is:

1. A method, comprising:
   assembling a low-resolution video mosaic of a scene as a field of view of a camera is swept over the scene;
   computing the number and locations of a set of high-resolution component photographs that tile the swept scene field of view; and
   said camera guiding a user to sweep the field of view of the camera over the scene a second time so that the location of each of the high-resolution component photographs is visited.

2. The method of claim 1, further comprising taking a high-resolution component photograph at each location.

3. The method of claim 2, wherein each high-resolution component photograph is taken automatically.

4. The method of claim 1, further comprising displaying the low-resolution video mosaic on a display on the camera.

5. The method of claim 4, further comprising dynamically scaling the low-resolution video mosaic to fit the display.

6. The method of claim 1, further comprising stitching the resulting component photographs into a high-resolution stitched panoramic photograph, the stitching performed in the camera.

7. The method of claim 1, further comprising:
   gathering information from substantially the entire scene from video frames used in assembling the low-resolution video mosaic;
   determining settings for focus, exposure, or both based on the gathered information; and
   using the settings in taking the high-resolution component photographs.

8. The method of claim 1, wherein guiding the user further comprises:
   indicating on the display the location of each component photograph;
   tracking the camera position; and
   indicating on the display the current field of view of the camera in relation to the component photograph locations.

9. The method of claim 8, wherein tracking the camera position further comprises analyzing successively captured digital images.

10. The method of claim 1, wherein guiding the user further comprises, for each of the component photographs:
    indicating on the display a window at the location of the component photograph to be taken;
    displaying in the window the portion of the scene at which the camera is currently aimed.

11. A camera, comprising:
    an electronic array light sensor;
    a lens that projects an image of a scene onto the electronic array light sensor;
    a display; and
    logic, the logic configured to construct a low-resolution video mosaic as the field of view of the camera is swept over the scene;

display the low-resolution video mosaic on the display;

calculate the number and locations of a set of high-resolution component photographs that tile the swept portion of the scene, the high-resolution component photographs to be stitched into a high-resolution panoramic photograph of the scene; and said camera guide a user to sweep the field of view of the camera over the scene a second time, visiting the location of each of the component photographs.

12. The camera of claim 11, wherein the logic is further configured to dynamically scale the low-resolution video mosaic on the display.

13. The camera of claim 11, wherein the logic is further configured to take a high-resolution component photograph at each of the locations.

14. The camera of claim 13, wherein the logic is further configured to take a high-resolution component photograph automatically when the camera is aimed substantially at one of the component photograph locations.

15. The camera of claim 11, wherein the logic is further configured to:

track motion of the camera during the second sweep; and indicate on the display the locations of the component photographs; and indicate on the display where the camera is aimed in relation to the component photograph locations.

16. The camera of claim 15, wherein the logic is further configured to track camera motion by analysis of successively captured digital images.

17. The camera of claim 11, wherein the logic is further configured to, during the second sweep and for each of the component photographs:

indicate on the display a window at the component photograph location; and repetitively show in the window the portion of the scene at which the camera is currently aimed.

18. The camera of claim 11, the logic further configured to:

gather information about substantially the entire scene from video frames used to construct the video mosaic;

compute settings for focus, exposure, or both from the gathered information; and use the settings in taking the component photographs.

19. A method of taking component photographs to be stitched into a panoramic photograph, comprising:

a first phase during which a field of view of a camera is swept over a scene by a user and the camera constructs a low-resolution video mosaic of the swept scene field of view; and a second phase during which the camera guides the user to sweep the camera field of view over the scene a second time, visiting locations of each of a set of component photographs that cover, with appropriate overlap, the field of view swept in the first phase.

20. The method of claim 19, further comprising:

displaying the low-resolution video mosaic on a display on the camera;

taking repetitive digital photographs after the first phase is complete;

using the repetitive digital photographs and the display to guide the user during the second phase sweep.

* * * * *

UNITED STATES PATENT AND TRADEMARK OFFICE
CERTIFICATE OF CORRECTION

PATENT NO. : 7,639,897 B2 Page 1 of 1
APPLICATION NO. : 11/339268
DATED : December 29, 2009
INVENTOR(S) : Gennetten et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1011 days.

Signed and Sealed this

Ninth Day of November, 2010

David J. Kappos
*Director of the United States Patent and Trademark Office*